(12) United States Patent
Saito et al.

(10) Patent No.: US 12,036,570 B2
(45) Date of Patent: Jul. 16, 2024

(54) FILTER MODULE FOR COATING EQUIPMENT

(71) Applicant: TRINITY INDUSTRIAL CORPORATION, Aichi (JP)

(72) Inventors: Ryota Saito, Aichi (JP); Ryo Yokoyama, Aichi (JP); Yuki Higashino, Osaka (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 0 days.

(21) Appl. No.: 17/428,658

(22) PCT Filed: Jan. 15, 2021

(86) PCT No.: PCT/JP2021/001172
§ 371 (c)(1),
(2) Date: Aug. 5, 2021

(87) PCT Pub. No.: WO2022/153473
PCT Pub. Date: Jul. 21, 2022

(65) Prior Publication Data
US 2024/0024907 A1    Jan. 25, 2024

(51) Int. Cl.
*B05B 14/43* (2018.01)
*B01D 45/08* (2006.01)
(Continued)

(52) U.S. Cl.
CPC ............. *B05B 14/43* (2018.02); *B01D 45/08* (2013.01); *B01D 46/0013* (2013.01);
(Continued)

(58) Field of Classification Search
None
See application file for complete search history.

(56) References Cited

U.S. PATENT DOCUMENTS 9,810,080 B2 * 11/2017 Stucki ..................... F01D 9/02
2016/0023231 A1 * 1/2016 Schmeinck ............ B05B 14/43
55/318
(Continued)

FOREIGN PATENT DOCUMENTS

CN          105149152          12/2015
CN          105149152 A    *   12/2015
(Continued)

OTHER PUBLICATIONS

WO2017080008A1_ENG (Espacenet machine translation of Zhou) (Year: 2017).*
(Continued)

*Primary Examiner* — Gabriel E Gitman
(74) *Attorney, Agent, or Firm* — Clark & Brody LP

(57) ABSTRACT

The objective of this invention is to provide a filter module for coating equipment that can improve the efficiency in removing coating-material mist and preventing the outflow of such coating-material mist to the outside. The filter module of this invention is made of a flammable material and includes an outer box, an eliminator and a baffle plate. Of the outer box, the air A2 containing the coating-material mist flows into the outer box from the outer-box inlet and is discharged from the outer-box outlet. The eliminator is formed by arranging zigzag-shaped eliminator elements in parallel to separate the coating-material mist from the air A2. The baffle plate is formed by arranging baffle-plate elements having an inclined surface for guiding the air A2 in parallel into the inflow-side space S2 of the eliminator, and guides the air A2 that has been introduced from the outer-box inlet to the inflow-side space S2.

13 Claims, 8 Drawing Sheets

(51) Int. Cl.
   *B01D 46/00* (2022.01)
   *B01D 46/121* (2022.01)
   *B05B 14/44* (2018.01)
   *B05B 14/48* (2018.01)

(52) U.S. Cl.
   CPC ..... *B01D 46/0039* (2013.01); *B01D 46/0047* (2013.01); *B01D 46/121* (2022.01); *B05B 14/44* (2018.02); *B05B 14/48* (2018.02); *B01D 2201/30* (2013.01); *B01D 2201/32* (2013.01)

(56) References Cited

U.S. PATENT DOCUMENTS

2019/0076869 A1 3/2019 Frohlich et al.
2020/0398300 A1 12/2020 Saito et al.

FOREIGN PATENT DOCUMENTS

| JP | 2012-242538 | 12/2012 | |
|----|----|----|----|
| JP | 6475241 | 2/2019 | |
| JP | 2021-000580 | 1/2021 | |
| WO | WO-2017080008 A1 * | 5/2017 | ............. B01D 45/08 |

OTHER PUBLICATIONS

CN105149152A_ENG (Espacenet machine translation of Zhou) (Year: 2015).*

\* cited by examiner

FILTER MODULE FOR COATING EQUIPMENT

TECHNICAL FIELD

The present invention relates to a filter module for coating equipment that separates coating material mist from air.

TECHNICAL BACKGROUND

Conventionally, various filter modules for separating coating-material mist from air have been proposed (see e.g. Patent Document 1). As shown in FIGS. 10 and 11, the filter module 101 includes an outer box 102 and a barrier wall 103. The outer box 102 has a rectangular parallelepiped shape, and has an outer-box inlet 104 that opens at the upper surface, and has an outer-box outlet 105 that opens at the side surface. In addition, the barrier wall 103 is arranged in the vicinity of the outer-box outlet 105 within the outer box 102, and is housed therein with a space S1 provided on the inflow side. Then, an air A1 containing the coating-material mist flows into the space S1 through the outer-box inlet 104, changes its direction by about 90 degrees to pass through the barrier wall 103, and is then discharged from the outer-box outlet 105. The coating-material mist is separated from the air A1 when passing through the barrier wall 103.

PRIOR ART DOCUMENTS

Patent Documents

Patent Document 1: JP Patent Publication No. 6475241 (FIG. 1 or the like)

DISCLOSURE OF THE INVENTION

Problems to be Solved by the Invention

However, in the case of the conventional filter module 101, described above, the space S1 is located at an uneven position in the outer box 102 (the position to the left, as shown in FIGS. 10 and 11), and the flow path is immediately narrowed. Thus, a pressure loss occurs in the air A1 that is guided from the outer-box inlet 104 to the space S1. In this case, since the air A1 flows unevenly toward a specific portion such as the inner surface of the outer box 102, or the barrier wall 103, or the like, a problem occurs that causes the efficiency in removing the coating-material mist to be lessened.

This invention has been achieved in light of the above-referenced problems. The purpose thereof such invention is to provide a filter module for coating equipment, which makes it possible to improve the efficiency in removing coating-material mist, thus preventing the outflow of coating-material mist to the outside.

Means for Solving the Problems

To solve the above problems, the first aspect of this invention refers to a filter module for coating equipment, made of a flammable material, which is provided on an exhaust passage of the coating equipment, characterized in that the filter module comprises; an outer box having an upper surface and a side surface, therein the outer box inlet opens at the upper surface, and the outer box outlet opens at the side surface, wherein air containing coating-material mist flows into the inside from the outer-box inlet and is discharged from the outer-box outlet; an eliminator that is housed in the vicinity of the outer-box outlet within the outer box, which is in the state of having a space on the inflow-side, and having a plurality of zigzag-and-plate shaped eliminator elements arranged in parallel, so as to separate the coating-material mist from the air; and a baffle plate that is housed in the vicinity of the outer-box inlet within the outer box, wherein a plurality of baffle-plate elements, having an inclined surface for guiding the air to the inflow space of the eliminator, are arranged in parallel, so as to guide the air that has been introduced from the outer-box inlet into the inflow-side space.

According to the first aspect of this invention, a baffle plate is housed in the vicinity of the outer-box inlet within the outer box; and a plurality of baffle-plate elements constituting the baffle plate have an inclined surface that guides air into the inflow-side space of the eliminator. Therefore, the air introduced into the outer box from the outer-box inlet collides with each baffle-plate element and changes the flowing direction, so that the air is guided into the inflow-side space. As such, the air is smoothly guided from the outer-box inlet to the inflow-side space. In this case, the air guided to the inflow-side space flows evenly to the inner surface of the outer box and to the surface of the eliminator element, which enables the coating-material mist contained in the air to adhere easily on more of the area of the inner surface of the outer box and on more of the surface of the eliminator element, thus improving the efficiency in removing the coating-material mist. In addition, the air introduced into the outer box from the outer-box inlet is guided by the baffle-plate element and surely flows into the inflow-side space, so that the coating-material mist contained in the air can be prevented from flowing out to the outside of the filter module.

Further, according to the first aspect of this invention, since the filter module is made of a flammable material, the filter module can be incinerated or disposed of and replaced. Here, examples of the flammable material include paper, resin, wood or the like. If corrugated cardboard or plastic corrugated cardboard is used as the flammable material, the strength of the filter module is improved.

The second aspect of this invention refers to a filter module for coating equipment, according to the first aspect of this invention, characterized in that an airflow smoothing plate made of a plurality of airflow smoothing plate elements, vertically extending and arranged in parallel, is housed in the inflow-side space, therein the pitch between the adjacent air-flow smoothing plate elements is greater than the pitch between the adjacent eliminator elements and less than the pitch between the adjacent baffle-plate elements.

According to the second aspect of this invention, an air-flow smoothing plate is housed in the inflow-side space, and a plurality of the airflow smoothing plate elements, constituting the air-flow smoothing plate, extend in the vertical direction. Thus, the air introduced into the inflow-side space from the baffle plate collides with each air-flow smoothing-plate element and changes its direction, so that the air is guided to the eliminator on the downstream side. As a result, the air flows uniformly and evenly. That is, the contact area of air-per-unit flow rate increases. Therefore, the coating-material mist contained in the air easily adheres to the surface of the airflow smoothing-plate element, and also easily adheres to the surface of the eliminator element on the downstream side, thus further increasing the efficiency in removing the coating-material mist.

Also, according to the second aspect of this invention, since the pitch between the adjacent elements becomes less toward the downstream side, the coating-material mist can be classified. Specifically, the baffle-plate element having the greatest pitch adheres and collects the coating-material mist having large particles in diameter; and the air-flow smoothing-plate element having a medium degree of pitch adheres and collects the coating-material mist having particles of medium size in diameter. The eliminator element having the least pitch adheres and collects the coating-material mist having the smallest particles in diameter. As a result, the coating-material mist having particles of great diameter makes it difficult for the flow passage on the downstream side, where the pitch between adjacent elements is less, to be clogged, so that the life duration of the filter module can be extended.

The third aspect of this invention refers to a filter module for coating equipment according to the first aspect of this invention, characterized in that a plurality of projection pieces are projected from the bottom surface of the outer box, therein the space between the adjacent projection pieces is a region for collecting the coating material.

According to the third aspect of this invention, by bringing air into contact with the bottom surface of the outer box, the coating-material mist contained in the air can be adhered to the region (the space between the adjacent projection pieces) where the coating material is collected. As a result, that makes it possible to prevent the coating material from flowing out of the space between the adjacent projection pieces.

The fourth aspect of this invention refers to a filter module for coating equipment, according to the first aspect of this invention, characterized in that a secondary filter, which allows the air that has passed through the eliminator to pass through the outflow-side of the eliminator, is provided with a part of the secondary filter to be projected from the outer box.

According to the fourth aspect of this invention, providing the secondary filter on the outflow-side of the eliminator makes it possible to eliminate reliably the coating-material mist that has not been completely removed from the air after passing through the eliminator. Further, since the secondary filter is provided with a part of the secondary filter to be projected from the outer-box outlet, the volume of the secondary filter can be secured. If the entire secondary filter is housed in the outer box, then the eliminator or the like may not be arranged at the desired position.

The fifth aspect of this invention refers to a filter module for coating equipment, according to the first aspect of this invention, characterized in comprising a spacer housed in the vicinity of the outer-box inlet within the outer box, in the state of being placed on the upper ends of the plurality of eliminator elements, having a bottom surface that abuts the upper ends of the eliminator elements, and having an inclined surface that guides the air into the inflow-side space, therein the inclination angle of the baffle-plate element with respect to the bottom surface of the outer box is greater than the inclination angle of the inclined surface with respect to the bottom surface of the spacer.

The sixth aspect of this invention refers to a filter module for coating equipment according to the first aspect of this invention, characterized in that the baffle plate has a plurality of connecting plates that are orthogonal to the baffle-plate elements and that connect the baffle-plate elements to each other while maintaining a distance from each other; therein the lower ends of the baffle-plate elements are located above the lower end of the connecting plate.

The seventh aspect of this invention refers to a filter module for coating equipment according to the first aspect of this invention, characterized in comprising a spacer housed in the vicinity of the outer-box inlet within the outer box, in the state of being placed on the upper ends of the plurality of eliminator elements, having a bottom surface that abuts the upper ends of the eliminator elements, and having an inclined surface that guides the air into the inflow-side space, therein the baffle plate has a plurality of connecting plates that are orthogonal to the baffle-plate elements and that connect the baffle-plate elements to each other while maintaining a distance from each other, thereof the connecting plate has an inclined edge, and the inclination angle of the inclined edge with respect to the bottom surface of the outer box is equal to the inclination angle of the inclined surface with respect to the bottom surface of the spacer.

The eighth aspect of this invention refers to a filter module for coating equipment according to the first aspect of this invention, characterized in comprising a spacer housed in the vicinity of the outer-box inlet within the outer box, in the state of being placed on the upper ends of the plurality of eliminator elements, having a bottom surface that abuts the upper ends of the eliminator elements, and having an inclined surface that guides the air into the inflow side space, therein the projected area of the inclined surface when viewed from the upper-surface side of the outer box is greater than the opening area of the upstream-side opening of the inflow-side space.

The ninth aspect of this invention refers to a filter module for the coating-equipment invention according to the first aspect of this invention, characterized in comprising a spacer housed in the vicinity of the outer-box inlet within the outer box; in the state of being placed on the upper ends of the plurality of eliminator elements, having a bottom surface that abuts the upper ends of the eliminator elements, and having an inclined surface that guides the air into the inflow side space, therein the spacer has a right-angled triangular shape in the side view, and the hypotenuse of the right-angled triangle constitutes the inclined surface.

The 10th aspect of this invention refers to a filter module for coating equipment according to the first aspect of this invention, characterized in that the baffle plate has a plurality of connecting plates that are orthogonal to the baffle-plate elements and that connect the baffle-plate elements to each other while maintaining a distance from each other, therein an air-flow smoothing plate, formed by arranging a plurality of air-flow smoothing-plate elements vertically extending in parallel, is housed in the inflow-side space, thereof the pitch between the adjacent air-flow smoothing plate elements is less than the pitch between the adjacent connecting plates.

The 11th aspect of this invention refers to a filter module for coating equipment according to the first aspect of this invention, characterized in that an air-flow smoothing plate, formed by arranging a plurality of air-flow smoothing-plate elements vertically extending in parallel, is housed in the inflow-side space, therein the downstream end of the air-flow smoothing-plate element is connected to the upstream end of the eliminator element.

The 12th aspect of this invention refers to a filter module for coating equipment according to the first aspect of this invention, characterized in that a plurality of projection pieces are projected from the bottom surface of the outer box; that the space between the adjacent projection pieces is a region for collecting coating material; and that an air-flow smoothing plate, formed by arranging a plurality of air-flow smoothing-plate elements vertically extending in parallel, is housed in the inflow-side space; therein the air-flow smoothing plate includes a plurality of upper-side connecting plates for connecting the upper ends of the plurality of air-flow smoothing-plate elements, and includes a plurality of lower-side connecting plates for connecting the lower ends of the plurality of air-flow smoothing-plate elements, and such a lower-side connecting plate is used as the projection piece.

The 13th aspect of this invention refers to a filter module for coating equipment according to the first aspect of this invention, characterized in that the filter module is entirely made of corrugated cardboard.

Effects of the Invention

As described in detail, above, the first to 13th aspects of this invention allow for providing a filter module for coating equipment capable of improving efficiency in removing coating-material mist and preventing the outflow of the coating-material mist to the outside.

MODES FOR CARRYING OUT THE INVENTION

Hereinafter, the embodiments of this invention are described in detail with reference to the drawings.

Figure 1:
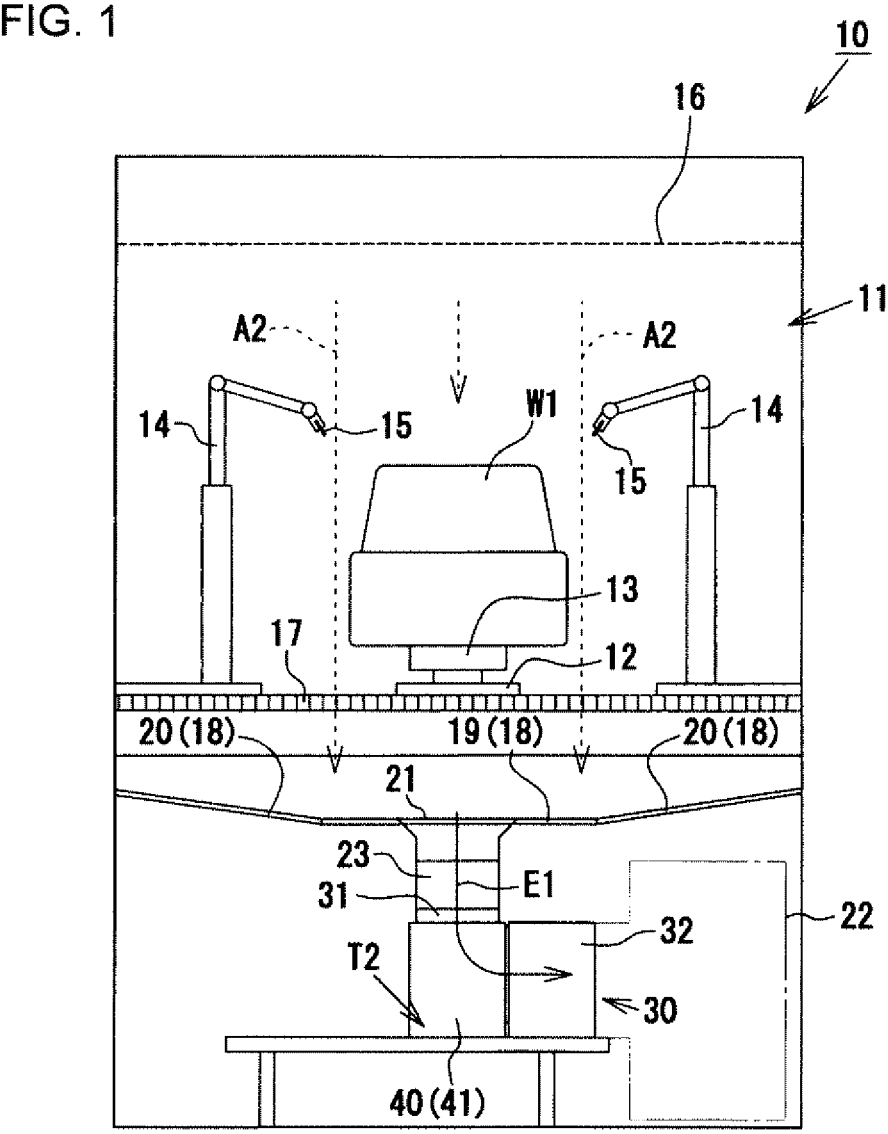
FIG. 1 is a schematic cross-sectional view showing the coating equipment according to the embodiment of this invention.
Figure 2:
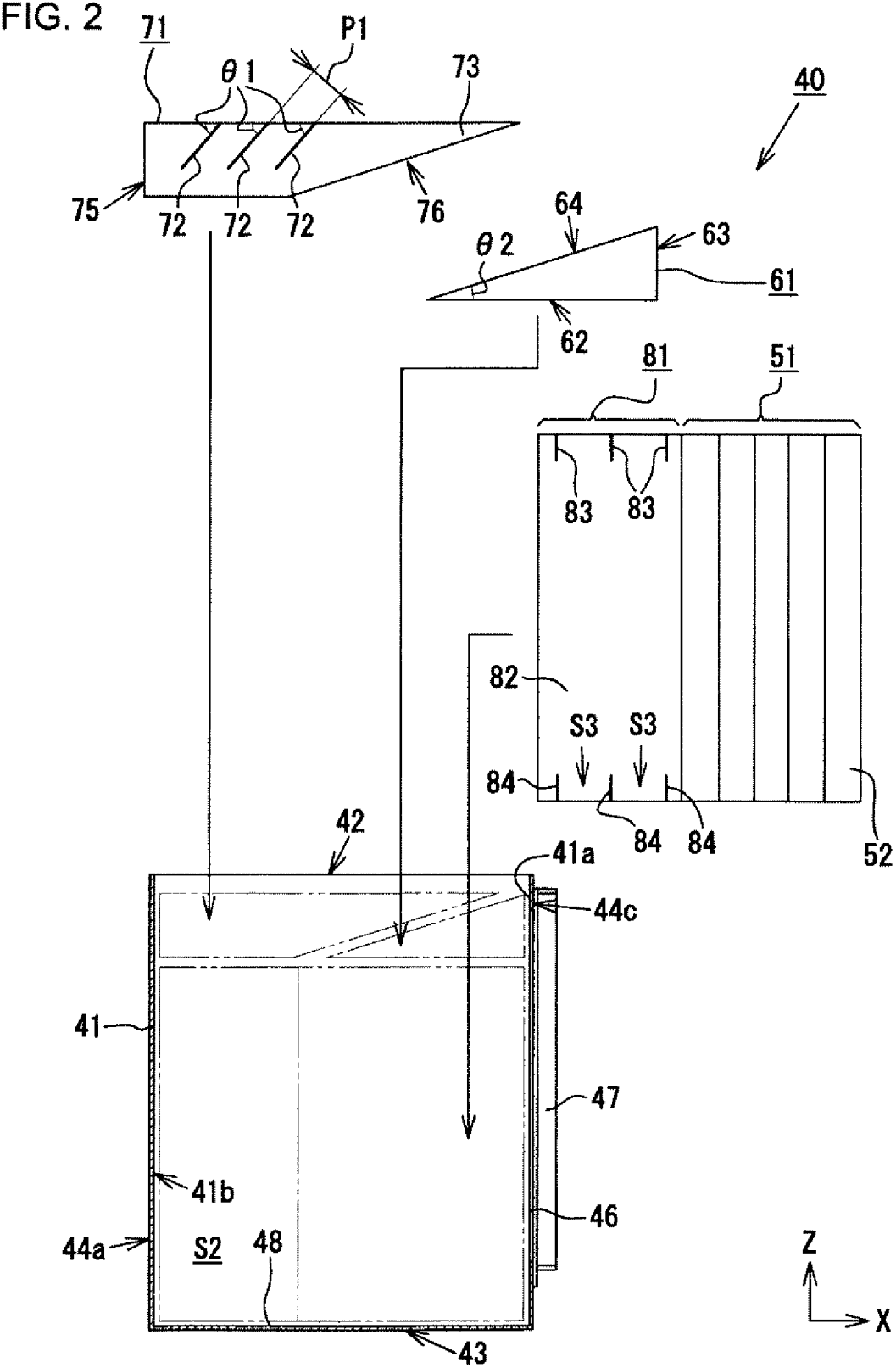
FIG. 2 is an exploded view showing the filter module.
Figure 3:
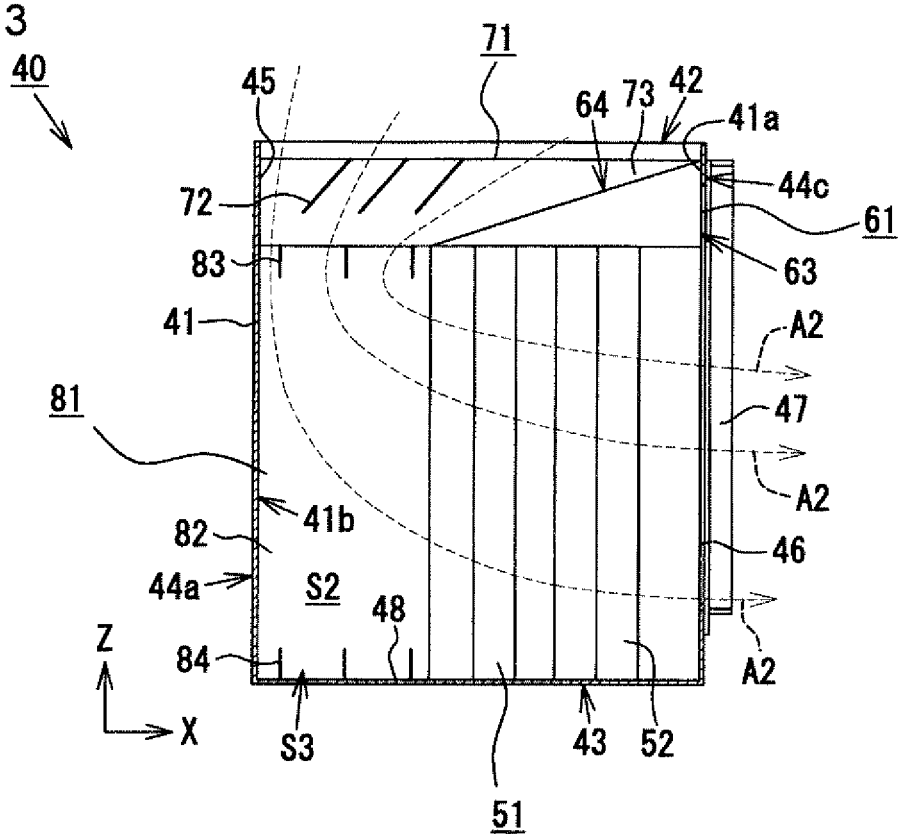
FIG. 3 is a side-sectional view showing the filter module.
Figure 4:
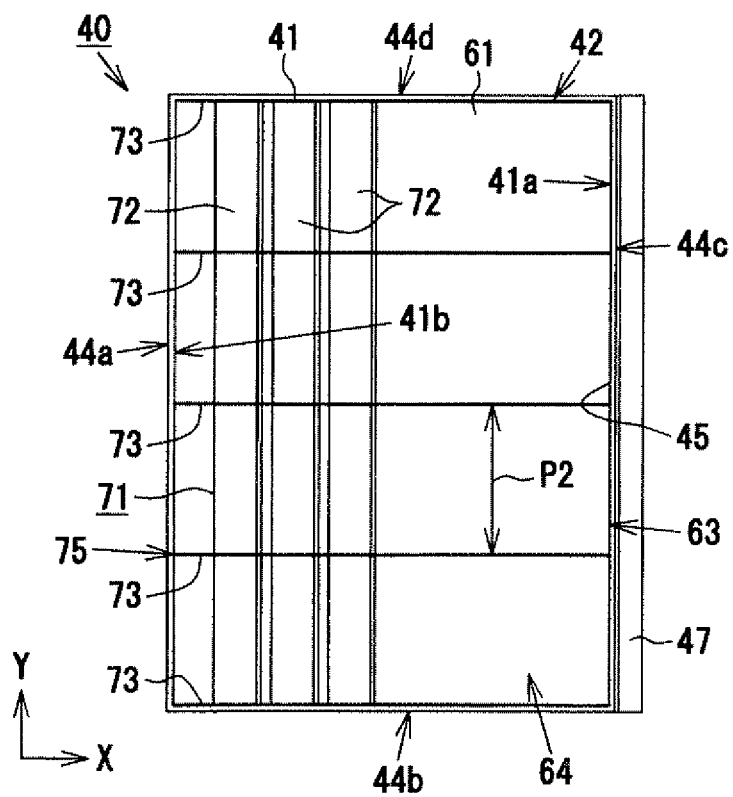
FIG. 4 is a plan view showing the filter module.
Figure 5:
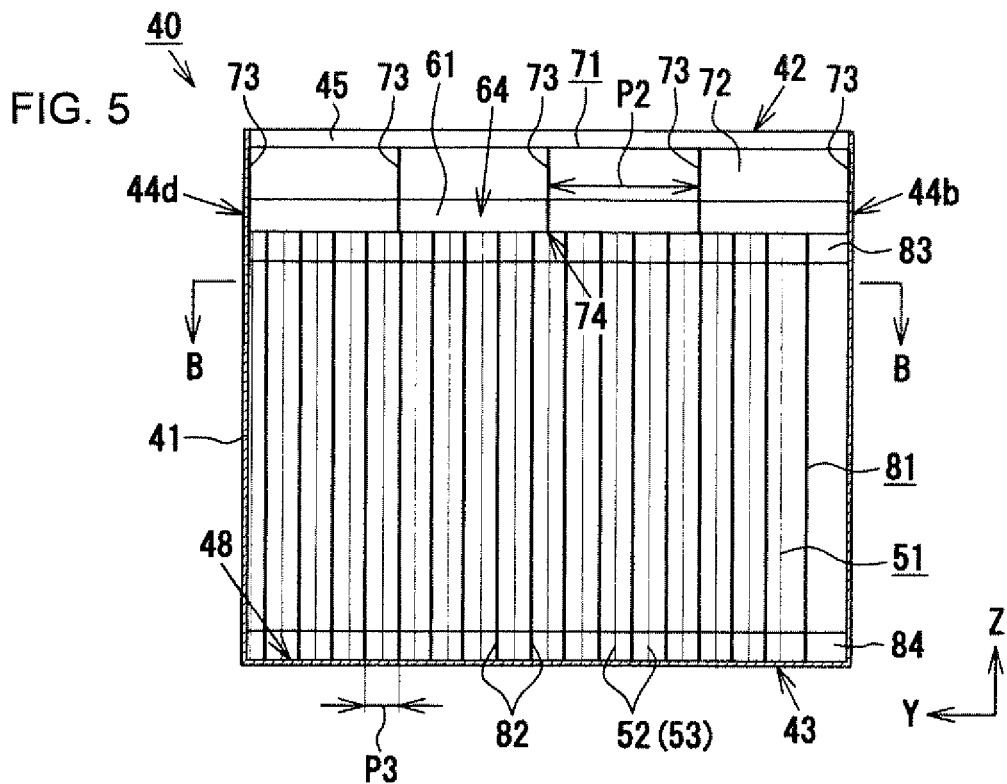
FIG. 5 is another side-sectional view showing the filter module.
Figure 6:
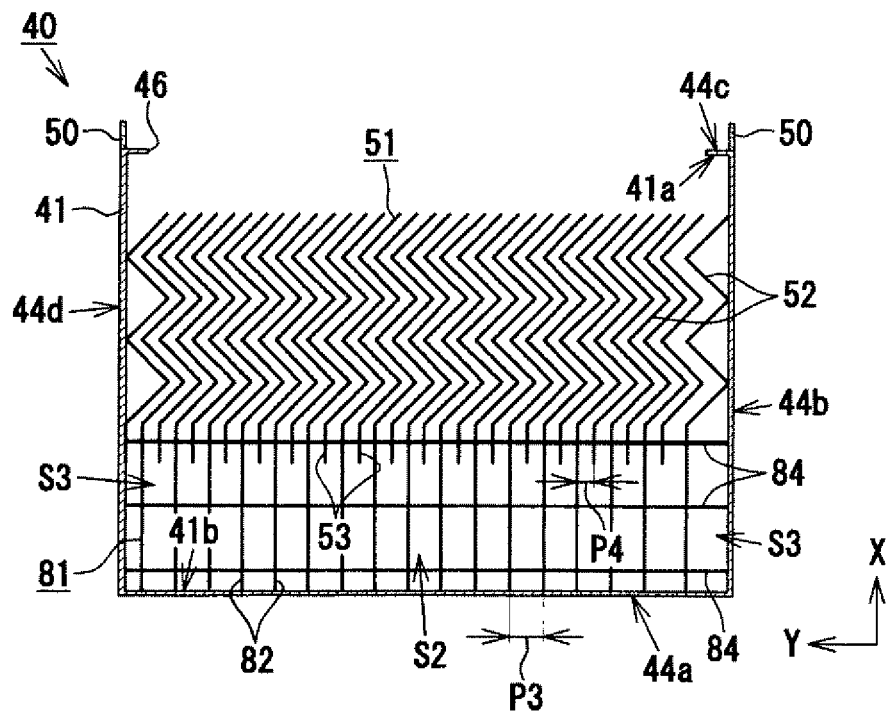
FIG. 6 is a cross-sectional view taken along the line B-B of FIG. 5.
Figure 7:
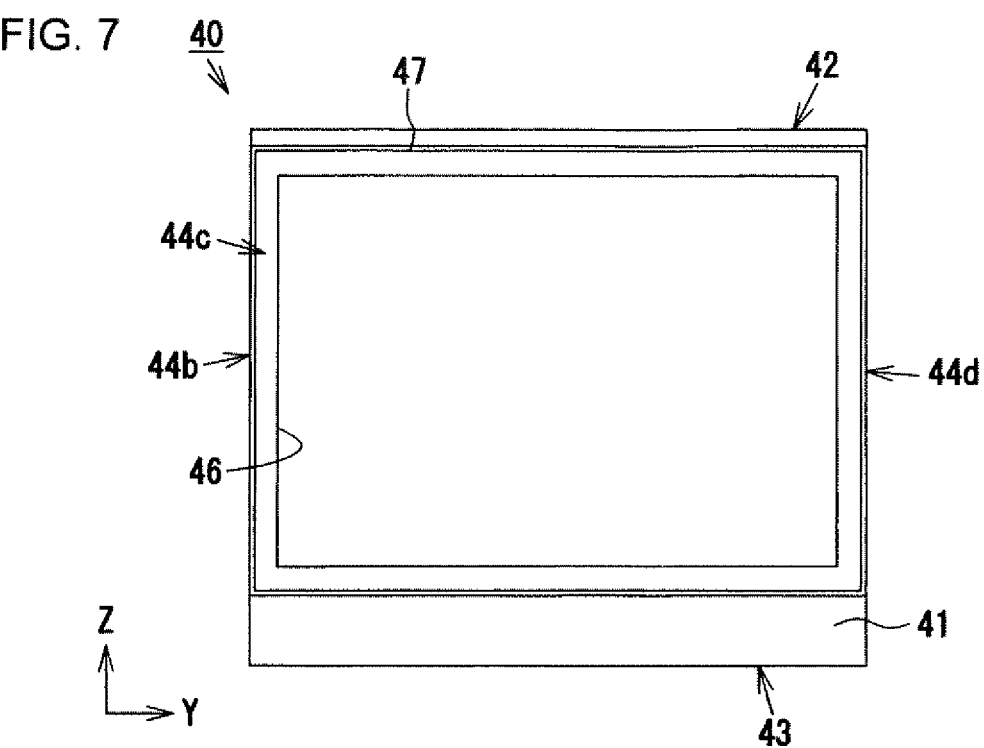
FIG. 7 is a side view showing the filter module.

As shown in FIG. 1, the filter module 40, as an embodiment of this invention, is provided on the exhaust passage E1 of the coating equipment 10. The transfer rail 12, the transfer carriage 13 that moves on the transfer rail 12, and a plurality of coating robots 14 arranged on both sides of the transfer rail 12 are provided in the coating chamber 11 constituting the coating equipment 10. In the coating chamber 11, atomized coating material (coating-material mist) is sprayed onto the work W1 (automobile body in this invention) from the coating gun 15 of the coating robot 14, thus forming the coating film on the surface of the work W1.

Also, a ceiling section 16 is provided above the coating chamber 11. The ceiling section 16 has a mesh structure, and compressed air A2 is supplied to the upper side. As a result, the air A2 passes through the ceiling section 16 and flows down into the coating chamber 11, so that the coating-material mist that has not adhered to the work W1 is guided downward. On the other hand, the floor 17 of the coating chamber 11 has a crosspiece structure, and an underfloor section 18 is arranged below. The underfloor section 18 includes a central portion 19, which is the lowest position, and a pair of inclined portions are provided on both sides of the central portion 19. An exhaust port 21 is provided in the central portion 19, and an exhaust duct 22 is connected to the exhaust port 21 via the coating-material mist-removing device 30.

The inside of the exhaust duct 22 is in the state of negative pressure due to a blower (not shown in the drawings). As such, the air A2 inside the coating chamber 11 passes through the coating-material mist-removing device 30 and then flows into the exhaust duct 22. Further, the coating-material mist contained in the air A2 is removed when passing through the coating-material mist-removing device 30. Then, the air A2 within the exhaust duct 22 is discharged to the outside of the coating equipment 10 after being subjected, e.g., to the Volatile Organic Compounds Gas (VOC) removal treatment by a deodorizing device (not shown in the drawings).

As shown in FIG. 1, a relay duct 23, communicating with the exhaust port 21 and extending downward, is connected to the central portion 19 of the underfloor section 18. The coating-material mist-removing device 30 is connected to the lower end of the relay duct 23 and to the suction hole (not shown in the drawings) of the exhaust duct 22. Specifically, the coating-material mist-removing device 30 includes an upstream-side duct 31 and a downstream-side duct 32. Then, an upper-end flange (not shown in the drawings) protruding from the upper end of the upstream-side duct 31 and a lower-end flange (not shown in the drawings) protruding from the lower end of the relay duct 23 are overlapped with a screw, so as to connect the coating-material mist-removing device 30 to the relay duct 23. The coating-material mist-removing device 30 is also connected to the exhaust duct 22 by inserting the downstream end of the downstream duct 32 into the suction hole of the exhaust duct 22.

A filter module 40 is removably attached between the upstream-side duct 31 and the downstream duct 32 of the coating-material mist-removing device 30. The filter module 40 is entirely made of a flammable material (specifically, corrugated cardboard). As shown in FIGS. 2 to 7, the filter module 40 includes an outer box 41, an eliminator 51, a spacer 61, a baffle plate 71 and an air-flow smoothing plate 81. The outer box 41 has a rectangular parallelepiped shape having an upper surface 42, a lower surface 43 and four side surfaces 44a, 44b, 44c, 44d. In addition, the outer box 41 has a rectangular-shaped outer-box inlet 45 that opens at the upper surface 42, and has a rectangular-shaped outer-box outlet 46 that opens at the side surface 44c of the downstream side (right side in FIG. 3). The opening area of the outer-box inlet 45 is greater than the opening area of the outer-box outlet 46 and is substantially equal to the area of the upper surface 42. Of the outer box 41 as an embodiment of this invention, the air A2 containing the coating-material mist flows into the outer box 41 from the outer-box inlet 45 and is discharged from the outer-box outlet 46. Also, a rectangular frame-shaped duct-connecting portion 47 surrounding the outer-box outlet 46 is projected from the side surface 44c of the outer box 41. Then, the duct-connecting portion 47 is inserted into the downstream duct 32, thus connecting the filter module 40 to the downstream duct 32.

As shown in FIGS. 2, 3, 5 and 6, the eliminator 51 is housed in the vicinity of the outer-box outlet 46 within the outer box 41, which is in the state of having a space on the inflow-side (inflow-side space S2). The eliminator 51 is formed by arranging a plurality of plate-shaped eliminator elements 52 in parallel and has the function of separating the coating-material mist from the air A2. Each eliminator element 52 vertically extends in the direction of Z (see FIGS. 3 and 5), and the lower end of each eliminator element 52 is in contact with the bottom surface 48 of the outer box 41. Also, the bottom surface 48 is in parallel with the upper surface 42 of the outer box 41. Furthermore, each eliminator element 52 horizontally extends in the direction of X (see FIGS. 3 and 6). Specifically, most of the eliminator elements 52 have a zigzag shape in the planar view, and only the end portions 53 on the inflow side (the lower-end portion in FIG. 6) has a linear shape in the planar view. Therefore, meandering passages are formed between the adjacent eliminator elements 52.

As shown in FIGS. 2 to 5, the spacer 61 is housed in the vicinity of the outer-box inlet 45 within the outer box 41, which is in the state of being placed on the upper end of each eliminator element 52. The spacer 61 has a right-angled triangular shape when viewed from the side, and has a spacer-bottom surface 62 that abuts the upper end of each eliminator element 52, and has a back surface 63 that abuts the inner surface 41a on the downstream side of the outer box 41, and has an inclined surface 64 that guides the air A2 into the inflow-side space S2. The hypotenuse of the right triangle constitutes the inclined surface 64. In addition, the projected area of the inclined surface 64 when viewed from the upper surface 42 of the outer box 41 is greater than the opening area of the upstream side opening of the inflow-side space S2 (see FIGS. 3 and 4).

A baffle plate 71 is housed in the vicinity of the outer-box inlet 45 within the outer box 41. The baffle plate 71 is formed by arranging a plurality of baffle-plate elements 72 having an inclined surface on the upper-side surface for guiding the air A2 into the inflow-side space S2 and has the function of guiding the air A2 introduced from the outer-box inlet 45 into the inflow-side space S2. Each baffle-plate element 72 extends horizontally in the direction of Y (see FIGS. 4 and 5). The inclination angles θ1 of each baffle-plate element 72 with respect to the upper surface 42 of the outer box 41 are equal to each other. Further, the inclination angle θ1 is greater than the inclination angle θ2 of the inclined surface 64 with respect to the spacer-bottom surface 62 of the spacer 61. Furthermore, the pitch P1 between each adjacent baffle-plate element 72 is equal to each other.

Further, as shown in FIGS. 2 to 5, the baffle plate 71 has a plurality of connecting plates 73 that are orthogonal to each baffle-plate element 72 and that connect the baffle-plate element 72 to each other while maintaining a distance from each other. Each connecting plate 73 horizontally extends in the direction of X (see FIGS. 3 and 4). Also, each connecting plate 73 has a lower-end edge 74 that abuts the upper end of the upper-connecting plate 83 of the air-flow smoothing plate 81, and has a side edge 75 that abuts the inner-side surface 41b on the upstream side of the outer box 41, and has an inclined edge 76 that abuts the inclined surface 64 of the spacer 61. The pitch P2 between each adjacent connecting plate 73 is equal to each other. Further, the lower end of each baffle-plate element 72 is located above the lower end of each connecting plate 73.

As shown in FIGS. 2, 3, 5 and 6, the air-flow smoothing plate 81 is housed in the inflow-side space S2 within the outer box 41. The air-flow smoothing plate 81 is formed by arranging a plurality of air-flow smoothing-plate elements 82 in parallel. Each air-flow smoothing-plate element 82 extends vertically in the direction of Z (see FIGS. 3 and 5), and the lower end of each is in contact with the bottom surface 48 of the outer box 41. Each air-flow smoothing-plate element 82 also extends horizontally in the direction of X (see FIGS. 3 and 6), and the downstream end of each is connected to the upstream end of the eliminator element 52, which makes it possible to reinforce mutually the air-flow smoothing plate 81 and the eliminator 51, and also makes it easier to keep the pitch P3 between the adjacent air-flow smoothing-plate elements 82 constant, and further, prevents a clearance from being formed between the downstream end of the air-flow smoothing-plate element 82 and the upstream end of the eliminator element 52, thus solving the problem that the air A2 enters the gap and is disturbed. The air-flow smoothing-plate element 82 may be integrated with or separated from the eliminator element 52. Then, the end portion 53 of the eliminator element 52 is arranged one by one between the adjacent air-flow smoothing-plate elements 82. Therefore, the pitch P3 between the adjacent air-flow smoothing-plate elements 82 is greater than the pitch P4 between the adjacent eliminator elements 52, and is specifically twice as great as the pitch P4. Furthermore, the pitch P3 is less than the pitch P1 between the adjacent baffle-plate elements 72 and less than the pitch P2 between the adjacent connecting plates 73.

Further, the air-flow smoothing plate 81 includes a plurality of upper-side connecting plates 83 for connecting the upper-end portions of each air-flow smoothing-plate element 82 to each other, and includes a plurality of lower-side connecting plates 84 for connecting the lower-end portions of each air-flow smoothing-plate element 82 to each other. Each upper-connecting plate 83 and each lower-side connecting plate 84 are orthogonal to each air-flow smoothing-plate element 82 and horizontally extend in the direction of Y (see FIGS. 5 and 6). Further, the upper end of each upper-connecting plate 83 abuts the lower end of each connecting plate 73 constituting the baffle plate 71. On the other hand, the lower end of each lower-side connecting plate 84 abuts the bottom surface 48 of the outer box 41. Also, each lower-side connecting plate 84 of the embodiment of this invention is used as a projection piece projecting from the bottom surface 48. As such, the space S3 between the adjacent lower-side connecting plates 84 becomes a region for collecting the coating material (coating-material mist).

Figure 8:
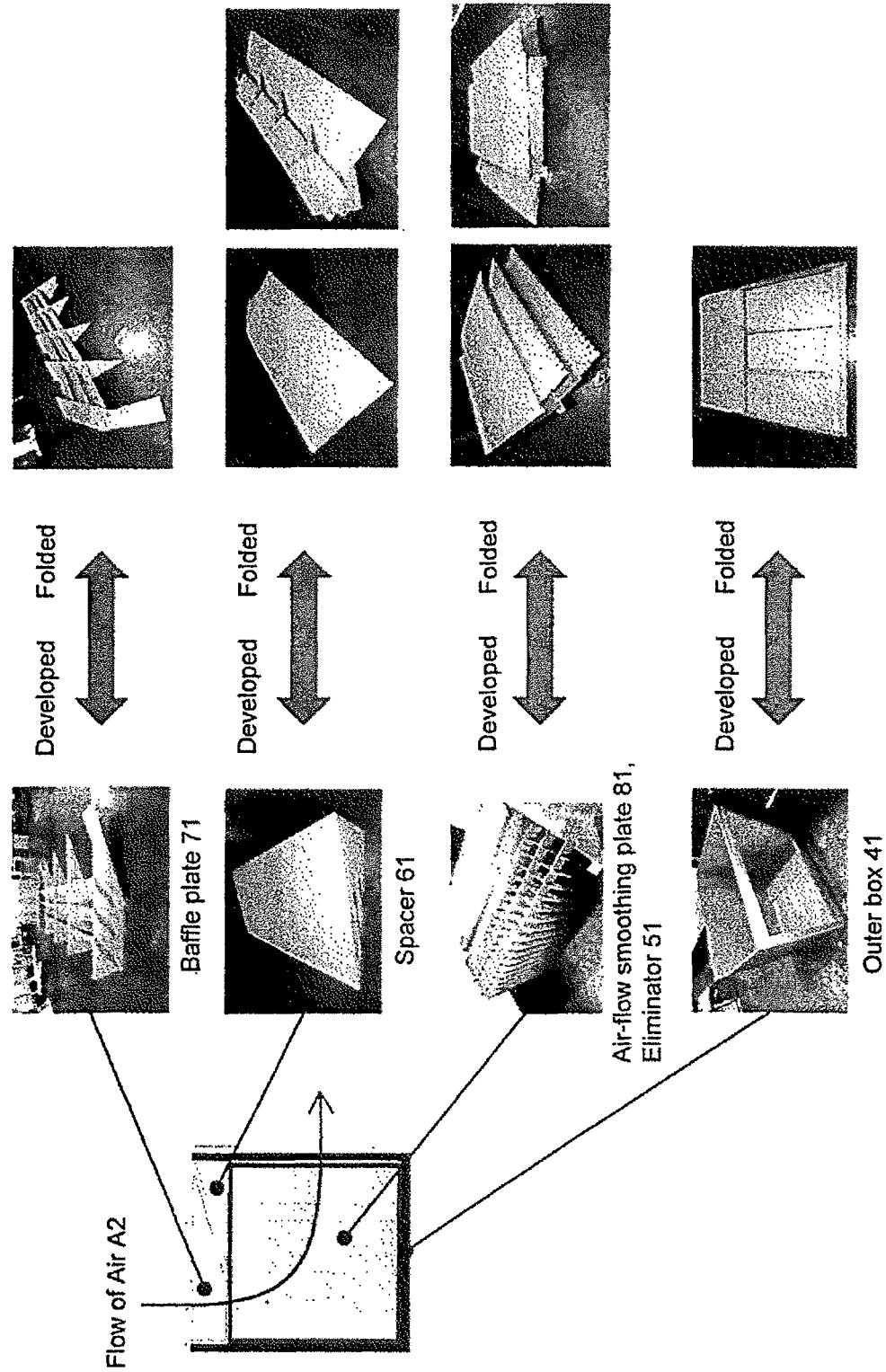
FIG. 8 is a photograph showing the developed and folded states of the outer box, the eliminator, the spacer, the baffle plate, and the air-flow smoothing plate.

As shown in FIG. 8, the above-mentioned outer box 41, the eliminator 51, the spacer 61, the baffle plate 71 and the air-flow smoothing plate 81 have a foldable structure. Also, the eliminator 51 and the air-flow smoothing plate 81 are connected together, and they can mutually be developed and folded. According to the embodiment of this invention, the components of the filter module 40 (the outer box 41, the eliminator 51 with the air-flow smoothing plate 81, the spacer 61 and the baffle plate 71) are transported in the state of being folded into a flat shape. Then, the filter module 40 is completed by assembling each component in the state of being developed. The completely developed filter module 40 is placed in a standby position (not shown in the drawings) outside the coating equipment 10. After that, when the filter module 40, in being used at the position T2 (see FIG. 1), becomes dirty with the coating-material mist, it is removed from the position T2 and incinerated as it is without being folded. That is, the coating-material mist is discarded together with the filter module 40. Then, a new filter module 40 in standby position is placed and used in position T2.

Hereinafter, the coating equipment 10 is described.

First, when the coating material is sprayed upon the work W1 from the coating gun 15, an excessively sprayed coating-material mist, together with the air A2 within the coating chamber 11, passes through the floor 17 of the coating chamber 11 and is guided to the underfloor section 18.

After that, the air A2 containing the coating-material mist is guided into the relay duct 23 from the exhaust port 21 of the underfloor structure 18, passes through the upstream-side duct 31, and then flows into the outer box 41 (filter module 40) from the outer-box inlet 45. Then, the air A2 collides with the inclined surface 64 of the spacer 61, with the surface of the baffle-plate element 72 of the baffle plate 71, and with the inner surface 41b on the upstream side of the outer box 41. Then, such air A2 is guided along to the inner surface 41b of the outer box 41. At this time, a part of the coating-material mist contained in the air A2 is removed by adhering to the inclined surface 64 of the spacer 61, to the surface of the baffle-plate element 72, and to the inner surface 41b of the outer box 41.

Then, the air A2 is guided to the air-flow smoothing plate 81 on the downstream side of the baffle plate 71 and flows between the adjacent air-flow smoothing plates 82. At this time, the air A2 comes into contact with the surface of the air-flow smoothing-plate element 82 and is guided along the surface of the air-flow smoothing-plate element 82. As a result, the flow of air A2 becomes uniform. Further, a part of the coating-material mist contained in the air A2 is removed by adhering onto the surface of the air-flow smoothing-plate element 82. Furthermore, the air A2 flows into the air-flow smoothing plate 81 as it is in a circular-arc motion and changes its direction substantially opposite to the direction guided by the baffle plate 71 (see FIG. 3). At this time, since a part of the air A2 collides with the bottom surface 48 of the outer box 41, a part of the coating-material mist contained in the air A2 is removed by adhering to the bottom surface 48.

Furthermore, the air A2 is guided by the eliminator 51 on the downstream side of the air-flow smoothing plate 81 to flow between the adjacent eliminator elements 52. Since each eliminator element 52 has a zigzag shape in the planar view, a meandering passage is formed between the adjacent eliminator elements 52. As a result, the air A2 flows in a meandering passage while colliding with the surface of each eliminator element 52, so that most of the coating-material mist contained in the air A2 is removed by adhering to the surface of each eliminator element 52. After that, the air A2 that has passed through the eliminator 51 is discharged from the outer-box outlet 46 to the outside of the outer box 41, passes, in order, through the downstream duct 32 to the exhaust duct 22, and then is discharged to the outside of the coating equipment 10.

Therefore, the embodiment of this invention realizes the following effects.

(1) According to the coating equipment 10 as an embodiment of this invention, the baffle-plate element 72, constituting the baffle plate 71, has an inclined surface on the upper-surface side that guides the air A2 into the inflow-side space S2 of the eliminator 51. Therefore, the air A2, introduced into the outer box 41 from the outer-box inlet 45, collides with each baffle-plate element 72, thus changing the flowing direction of the air A2, so that the air A2 is guided into the inflow-side space S2. As such, the air A2 is smoothly guided from the outer-box inlet 45 to the inflow-side space S2. In this case, the air A2 that is guided to the inflow-side space S2 flows evenly to the inner surface 41b of the outer box 41 and to the surface of each eliminator element 52, which enables the coating-material mist contained in the air A2 to adhere easily on more area of the inner surface 41b of the outer box 41 and of the surface of each eliminator element 52, thus improving efficiency in removing the coating-material mist. In addition, the air A2, introduced into the outer box 41 from the outer-box inlet 45, is guided by the baffle-plate element 72 and surely flows into the inflow-side space S2, so that the coating-material mist contained in the air A2 is prevented from flowing out to the outside of the filter module 40.

(2) According to the embodiment of this invention, the outer box 41, the eliminator 51 with the air-flow smoothing plate 81, the spacer 61 and the baffle plate 71, which are the components of the filter module 40, have a foldable structure. As a result, the components of the filter module 40 can be transported in the state of being folded into small pieces, so that the transport labor load can be reduced. In addition, since the components that are folded can be compactly stored, it is easy to secure a storage space.

(3) According to the embodiment of this invention, since the filter module 40 is made of corrugated cardboard, which is a flammable material, the filter module 40 can be incinerated and easily discarded. Furthermore, the filter module 40 can be made at low cost.

Also, the embodiment of this invention can be modified, as follows.

According to the above-described embodiment, the eliminator 51, the spacer 61, the baffle plate 71 and the air-flow smoothing plate 81 are housed in the outer box 41 constituting the filter module 40. However, the air-flow smoothing plate 81 and the spacer 61 may be omitted.

According to the above embodiment of this invention, a plurality of lower-side connecting plates 84 constituting the airflow smoothing plate 81 are used as projection pieces projecting from the bottom surface 48 of the outer box 41. However, each projection piece may be a separate body from the lower-side connecting plate 84 to be connected to the bottom surface 48. Otherwise, such projection pieces may be omitted.

Figure 9:
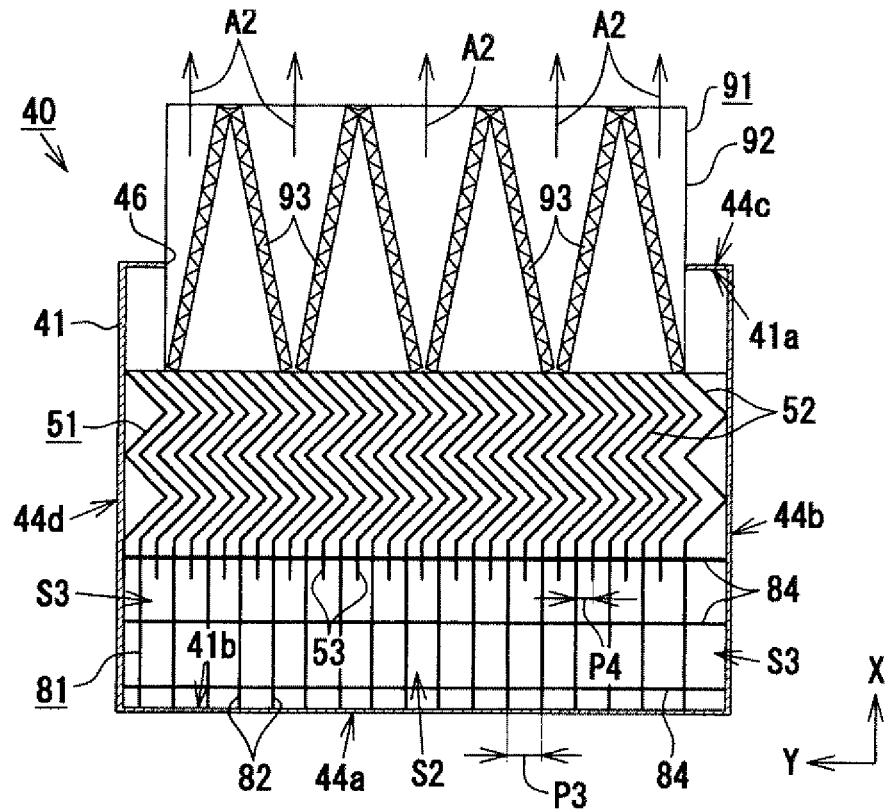
FIG. 9 is a schematic cross-sectional view showing the filter module of another embodiment.
Figure 10:
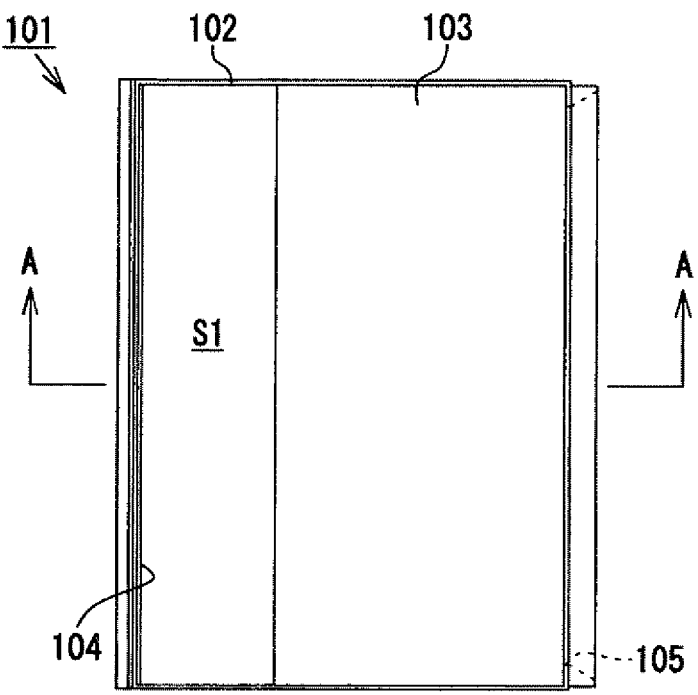
FIG. 10 is a plan view showing the conventional filter module.
Figure 11:
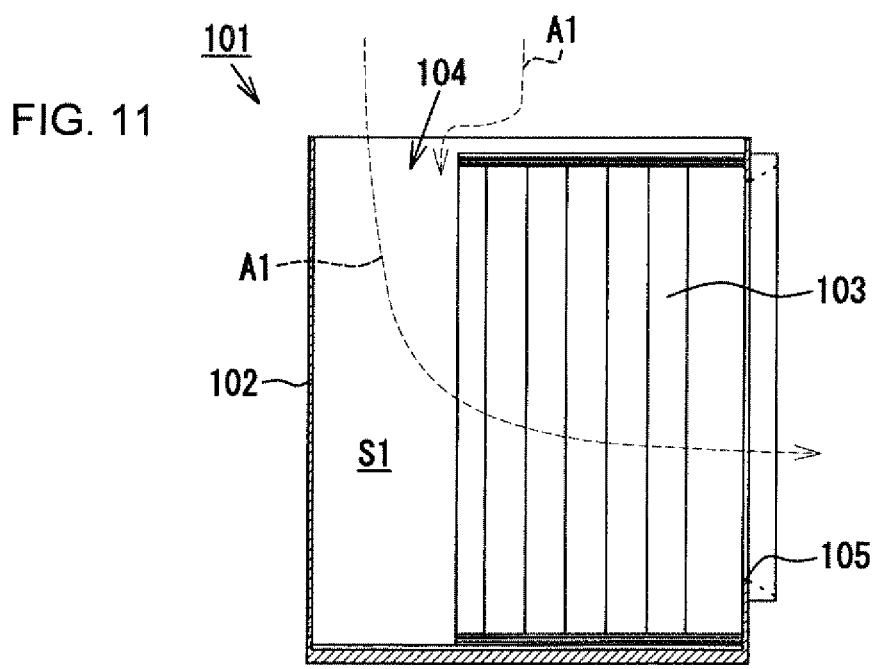
FIG. 11 is a cross-sectional view taken along the line A-A of FIG. 10.

As shown in FIG. 9, it is also possible to provide a secondary filter 91 to let the air A2 that has passed through the eliminator 51 to pass through the outflow side (upper side in FIG. 9) of the eliminator 50. The secondary filter 91 is configured by arranging the filters 93, having a doglegged cross-section, in parallel in the direction of Y within the case 92. A part of the secondary filter 91 is projected from the outer outlet 46. In this way, the coating-material mist that has not been completely removed from the air A2, after passing through the eliminator 51, can also be reliably removed by the secondary filter 91. In addition, since the secondary filter 91 is provided with a part thereof being projected from the outer-box outlet 46, the volume of the secondary filter 91 can be secured. If the entire secondary filter 91 is housed in the outer box 41, the eliminator 51 or the like may not be arranged at a desired position.

According to the above embodiment of this invention, the work W1 onto which the coating material is sprayed is an automobile body. However, the work W1 may be an automobile component such as an aerodynamic appendage (e.g., spoilers) or bumpers or the like. The work W1 is not necessarily an automobile component.

DESCRIPTION OF THE REFERENCE NUMERALS

10: Coating equipment
40: Filter module
41: Outer box
42: Upper surface of the outer box
44c: Side surface of the outer box 45: Outer-box inlet
46: Outer-box outlet
48: Bottom surface of the outer box
51: Eliminator
52: Eliminator element
71: Baffle plate
72: Baffle-plate element
81: Air-flow smoothing plate
82: Air-flow smoothing-plate element
84: Lower-side connecting plate as the projection piece
91: Secondary filter
A2: Air
E1: Exhaust passage
P3: Pitch between adjacent air-flow smoothing-plate elements
P4: Pitch between adjacent eliminator elements
S2: Inflow-side space
S3: Space between adjacent projection pieces

The invention claimed is:

1. A filter module for coating equipment, made of a flammable material, which is provided on an exhaust passage of the coating equipment, characterized in that the filter module comprises:
an outer box having an upper surface and a side surface, therein an outer-box inlet opens at the upper surface, and an outer-box outlet opens at the side surface, wherein air containing coating-material mist flows into an inside from the outer-box inlet and is discharged from the outer-box outlet;
an eliminator that is housed in a vicinity of the outer-box outlet within the outer box, which is in a state of having a space on an inflow-side, and having a plurality of zigzag-and-plate shaped eliminator elements arranged in parallel, so as to separate the coating-material mist from the air; and
a baffle plate that is housed in the vicinity of the outer-box inlet within the outer box, wherein a plurality of adjacent baffle-plate elements, each having an inclined surface for guiding the air to the inflow-side space of the eliminator, are arranged in parallel, so as to guide the air that has been introduced from the outer-box inlet into the inflow-side space.

2. The filter module for coating equipment, according to claim 1, characterized in that an air-flow smoothing plate made of a plurality of adjacent air-flow smoothing plate elements, vertically extending and arranged in parallel, is housed in the inflow-side space, wherein a pitch between the air flow smoothing plate elements is greater than a pitch between the adjacent zigzag-and-plate shaped eliminator elements and less than a pitch between the baffle-plate elements.

3. The filter module for coating equipment according to claim 1, characterized in that a plurality of projection pieces are projected from a bottom surface of the outer box, wherein space(s) between adjacent projection pieces are each a region for collecting the coating material.

4. The filter module for coating equipment, according to claim 1, characterized in that a secondary filter, which allows the air that has passed through the eliminator to pass through an outflow-side of the eliminator, is provided downstream of the eliminator with a part of the secondary filter to be projected from the outer box.

5. The filter module for coating equipment, according to claim 1, comprising:
a spacer housed in the vicinity of the outer-box inlet within the outer box, in the state of being placed on upper ends of the plurality of zigzag-and-plate shaped eliminator elements, and having a bottom surface that abuts the upper ends of the zigzag-and-plate shaped eliminator elements, the spacer having an inclined surface that guides the air into the inflow-side space,
wherein the inclination angle of each baffle-plate element with respect to a bottom surface of the outer box is greater than an inclination angle of the inclined surface of the spacer with respect to the bottom surface of the spacer.

6. The filter module for coating equipment according to the claim 1, characterized in that the baffle plate has a plurality of connecting plates that are orthogonal to the baffle-plate elements and that connect the baffle-plate elements to each other while maintaining a distance from each other, therein the lower end of each baffle-plate element is located above a lower end of each connecting plate.

7. The filter module for coating equipment according to claim 1, comprising:
a spacer housed in the vicinity of the outer-box inlet within the outer box, in the state of being placed on upper ends of the plurality of the zigzag-and-plate shaped eliminator elements, and having a bottom surface that abuts the upper ends of the zigzag-and-plate shaped eliminator elements, the spacer having an inclined surface that guides the air into the inflow-side space;
wherein the baffle plate has a plurality of connecting plates that are orthogonal to the baffle-plate elements and that connect the baffle-plate elements to each other while maintaining a distance from each other; each connecting plate having an inclined edge, and an inclination angle of the inclined edge with respect to the bottom surface of the outer box is equal to an inclination angle of the inclined surface of the spacer with respect to the bottom surface of the spacer.

8. The filter module for coating equipment according to claim 1, comprising:
a spacer housed in the vicinity of the outer-box inlet within the outer box, in the state of being placed on upper ends of a plurality of the zigzag-and-plate shaped eliminator elements, and having a bottom surface that abuts the upper ends of the zigzag-and-plate shaped eliminator elements, the spacer having an inclined surface that guides the air into the inflow-side space,
wherein the projected area of the inclined surface of the spacer when viewed from the upper-surface side of the outer box is greater than an opening area of an upstream-side opening of the inflow-side space.

9. The filter module for the coating-equipment invention according to claim 1, comprising:
a spacer housed in the vicinity of the outer-box inlet within the outer box, in the state of being placed on upper ends of the plurality of the zigzag-and-plate shaped eliminator elements, having a bottom surface that abuts the upper ends of the zigzag-and-plate shaped eliminator elements, the spacer having an inclined surface that guides the air into the inflow-side space,
wherein the spacer has a right-angled triangular shape in a side view, and the hypotenuse of the right-angled triangle constitutes the inclined surface.

10. The filter module for coating equipment according to claim 1, characterized in that the baffle plate has a plurality of adjacent connecting plates that are orthogonal to the baffle-plate elements and that connect the baffle-plate elements to each other while maintaining a distance from each other, wherein an air-flow smoothing plate, formed by arranging a plurality of adjacent air-flow smoothing-plate elements vertically extending in parallel, is housed in the inflow-side space, thereof a pitch between the air-flow smoothing plate elements is less than a pitch between the connecting plates.

11. The filter module for coating equipment according to claim 1, characterized in that an air-flow smoothing plate, formed by arranging a plurality of the air-flow smoothing-plate elements vertically extending in parallel, is housed in the inflow-side space;
   wherein a downstream end of each air-flow smoothing-plate element is connected to an upstream end of each zigzag-and-plate shaped eliminator element.

12. The filter module for coating equipment according to claim 1, characterized in that a plurality of projection pieces are projected from a bottom surface of the outer box; wherein space(s) between the adjacent projection pieces are each a region for collecting coating material; and that an air-flow smoothing plate, formed by arranging a plurality of air-flow smoothing-plate elements vertically extending in parallel, is housed in the inflow-side space;
   wherein the air-flow smoothing plate includes a plurality of upper-side connecting plates for connecting upper ends of the plurality of air-flow smoothing-plate elements, and includes a plurality of lower-side connecting plates for connecting lower ends of the plurality of air-flow smoothing-plate elements, and such a lower-side connecting plate is used as each projection piece.

13. The filter module for coating equipment according to claim 1, characterized in that the filter module is entirely made of corrugated cardboard.

\* \* \* \* \*